(12) United States Patent
Sigmund et al.

(10) Patent No.: US 10,208,214 B2
(45) Date of Patent: *Feb. 19, 2019

(54) DURABLE AND SUPERHYDROPHOBIC OVER COATING

(71) Applicant: University of Florida Research Foundation, Inc., Gainesville, FL (US)

(72) Inventors: Wolfgang M. Sigmund, Gainesville, FL (US); Yung-Chieh Hung, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/444,867

(22) Filed: Feb. 28, 2017

(65) Prior Publication Data

US 2017/0260403 A1 Sep. 14, 2017

Related U.S. Application Data

(60) Provisional application No. 62/306,823, filed on Mar. 11, 2016.

(51) Int. Cl.
| | |
|---|---|
| *C09D 7/62* | (2018.01) |
| *C09D 127/16* | (2006.01) |
| *C09D 7/40* | (2018.01) |
| *C09D 7/20* | (2018.01) |
| *C09D 5/16* | (2006.01) |
| *C08K 5/521* | (2006.01) |
| *C08K 9/06* | (2006.01) |

(52) U.S. Cl.
CPC ............ *C09D 7/62* (2018.01); *C09D 5/1681* (2013.01); *C09D 7/20* (2018.01); *C09D 7/67* (2018.01); *C09D 7/68* (2018.01); *C09D 7/69* (2018.01); *C09D 127/16* (2013.01); *C08K 5/521* (2013.01); *C08K 9/06* (2013.01)

(58) Field of Classification Search
None
See application file for complete search history.

(56) References Cited

U.S. PATENT DOCUMENTS

| | | | | |
|---|---|---|---|---|
| 5,322,557 A | * | 6/1994 | Inomata | .............. C07F 7/182 106/287.13 |
| 5,714,277 A | * | 2/1998 | Kawakami | ......... H01M 2/1686 429/129 |
| 5,916,643 A | * | 6/1999 | Spain | .................... B05D 1/286 428/31 |
| 6,723,439 B2 | * | 4/2004 | Amidaiji | ................. C08K 3/36 427/387 |
| 8,309,181 B2 | * | 11/2012 | Ishizuka | ................. B05D 7/24 427/379 |
| 2008/0015298 A1 | * | 1/2008 | Xiong | ..................... C08K 3/22 524/432 |
| 2008/0153963 A1 | * | 6/2008 | Baran | ..................... C08K 3/32 524/414 |

FOREIGN PATENT DOCUMENTS

JP    H10273617    * 10/1998

OTHER PUBLICATIONS

Translation of JP H10273617 (1998) (Year: 1998).*

* cited by examiner

*Primary Examiner* — Robert C Boyle
(74) *Attorney, Agent, or Firm* — Timothy H. Van Dyke; Beusse, Wolter, Sanks & Maire PLLC

(57) ABSTRACT

An overcoat that imparts a superhydrophobic surface to a painted surface of an object is a suspension of hydrophobic particles in a polymeric binder and a plasticizer in a solvent or mixed solvent. The particles are a metal oxide that is surface functionalized with a fluorinated alkyl silane or an alkyl silane. Surfaces coated using this paint display contact angles in excess of 150° and resist abrasion while retaining superhydrophobicity.

8 Claims, 3 Drawing Sheets

DURABLE AND SUPERHYDROPHOBIC OVER COATING

CROSS-REFERENCE TO A RELATED APPLICATION

This application claims the benefit of U.S. Provisional Application Ser. No. 62/306,823, filed Mar. 11, 2016, the disclosure of which is hereby incorporated by reference in its entirety, including all figures, tables and drawings.

BACKGROUND OF INVENTION

Superhydrophobicity is defined as a material or surface with a water contact angle greater than 150° and the roll off angle or contact angle hysteresis less than 10°. The coating is hard to wet by water which imparts some compelling properties like self-cleaning and antibio-fouling. Textbooks describe superhydrophobicity as depending on the surface roughness or topography. The best published phenomenon is the lotus-effect, which occurs because of the affluent tiny protrusions on the lotus or taro leaf to yield a contact angle >150° accompanied by a few degrees of roll-off angle. The second factor that is important for superhydrophobicity depends on the surface material and, typically, fluorinated compounds are employed to reduce surface energy to levels appropriate for superhydrophobicity. The most crucial criterion for superhydrophobicity is retaining the water droplet in the Cassie-Baxter state, where air pockets are trapped under the droplet to reduce the solid-liquid interface. State of the art coatings with micro-scale roughness often possess the drawbacks of poor durability and/or poor optical properties. Therefore, a durable superhydrophobic surface that is scalable to coverage of a large surface remains a goal.

BRIEF DESCRIPTION OF DRAWINGS

FIG. 1 shows photographs of.

DETAILED DISCLOSURE

Figure 1A:
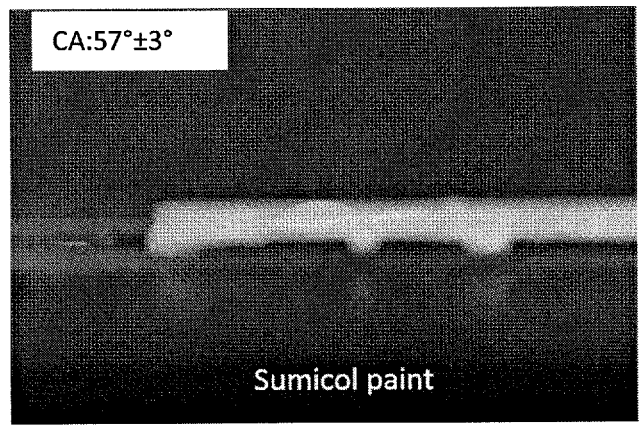
FIG. 1A a water drop on the surface of a paint.

Embodiments of the invention are directed to an overcoating for painted surfaces that impart superhydrophobicity to the painted surface. The overcoats, according to an embodiment of the invention, comprise: functionalized silica particles; binders that are a polymer blend of polymethyl methacrylate (PMMA) and polyvinylidene fluoride (PVDF); and plasticizers that are triethyl phosphate and perfluoro compounds. In embodiments of the invention, silica particles of specific surface area of, for example, 35-65 $m^2/g$ are employed, where the diameters of the silica particles are 50 to 110 nm. The silica particles are functionalized by a silane coupling agent, for example, heptadecafluoro-1,1,2,2-tetrahydrodecyltrichlorosilcane, to provide a fluorination entity on the particles. In embodiments of the invention, the binders are a blend of, for example, PMMA and PVDF of molecular weights, for example, 75,000 and 900,000 to 1,300,000, respectively that are comprised in a solution in a mixed solvent of dimethylformamide and acetone. In embodiments of the invention, the plasticizer is, for example, a mixture of triethylphosphate and perfluoro (butyltetrahydrofuran) or other phosphates and prefluorocarbons. By combination of these components a homogeneous paint is formed.

In addition to the $SiO_2$ particles, the overcoat can be any metal oxide, including, but not limited to $TiO_2$, $Al_2O_3$, or other related ceramic powders having particles diameter of 40 nm to 100 micrometers. The particles can be functionalized with a compound to form a self-assembled monolayer or a surface specific attachment that is fluorinated for a low surface energy, where in addition to heptadecafluoro-1,1,2,2-tetrahydrodecyltrichlorosilane, the functionalizing agent can be heptadecafluorodecyl trichlorosilane, heptadecafluoro-1,1,2,2-tetrahydrodecyltrimethoxysilane, 1H,1H,2H,2H-perfluorodecyltriethoxysilane, other perfluoroalkyl silanes, or a long-chain alkyl silane, such as octadecyltrichlosilane. The volume percent particulates in the overcoat can be 35 to 75%. The binder can be, for example, PDVF and PMMA mixture, and has a PVDF to PMMA ratio of about 5 to 1, about 10 to 1, about 9 to 1, about 8 to 1, about 7 to 1, about 6 to 1, about 4 to 1, about 3 to 1, or any ratio between about 3:1 and 10:1

According to an embodiment of the invention, the overcoat can be applied and dried to form a continuous hydrophobic surface on top of a painted surface. The overcoat can be applied by spraying, rolling, brushing or any other method to a previously painted surface.

The overcoat can be prepared with any solvent that permits the blending of PVDF and PMMA. Solvents that can be employed include, but are not limited to DMF (dimethylformamide), MEK (methyl ethyl ketone), and isophorone. Additionally, other acrylates and methacrylates can be combined in the paint. The acrylates and methacrylates can be homopolymers or copolymers. For example, a copolymer of methyl methacrylate and ethyl acrylate can be used to form the binder. PMMA can be atactic, syndiotactic, or isotactic.

METHODS AND MATERIALS

Silica particles, Aerosil Ox 50, were purchased from Evonik Industries. The specific surface area of the particles is 35-65 $m^2/g$. The diameter of silica particles are between 50~110 nm. Heptadecafluoro-1,1,2,2-tetrahydrodecyltrichlorosilane was purchased from Gelest Inc. PVDF was obtained from Kynar Hsv 900 with $M_n$ 900,000-1,300,000 g/mol and PMMA was obtained from Polyscience Inc. with $M_n$ 75,000. Perfluoro(butyltetrahydrofuran) FC-75™, was purchased from ACROS.

Silica particles were dehydrated in an oven at 120° C., cooled and dispersed in chloroform. Subsequently, heptadecafluoro-1,1,2,2-tetrahydrodecyltrichlorosilcane was added to the silica-chloroform dispersion and stirred for one hour. The dispersion was centrifuged and the chloroform decanted. The fluorinated particles were dried at 120° C. on a heating plate.

PVDF was dissolved in DMF at 5 wt % and PMMA was dissolved in acetone at 5 wt %. The 5 wt % PVDF solution and 5 wt % PMMA solutions were mixed at a 5:1 ratio and stirred vigorously for 30 minutes to form a binder solution.

In Formulation I of Table 1, above, a 5 g aliquot of the binder solution, 5 g of 99.8% DMF, 1 g triethylphosphate and 100 µl of perfluoro(butyltetrahydrofuran) were combined and homogenized using a use vortex mixture to form the liquid portion of paint. To equivalent 11.1 g liquid portions were added 0.88 g and 0.5 g of the particles to yield 74 and 61% particle loadings by volume and labled SG#1 and SG#2, respectively.

Substrates of soda-lime glass were spin-coated at 200 rpm with the paint Corona® from Sumicol S.A.S., labeled as Sumicol herein, and allowed to dry at room temperature for 12 hours in an air conditioned laboratory. The SG#1 and SG#2 formulations were separately spin coated as overcoats on the painted soda-lime glass substrates and allowed to dry at room temperature for 12 hours in an air conditioned laboratory.

Figure 1B:
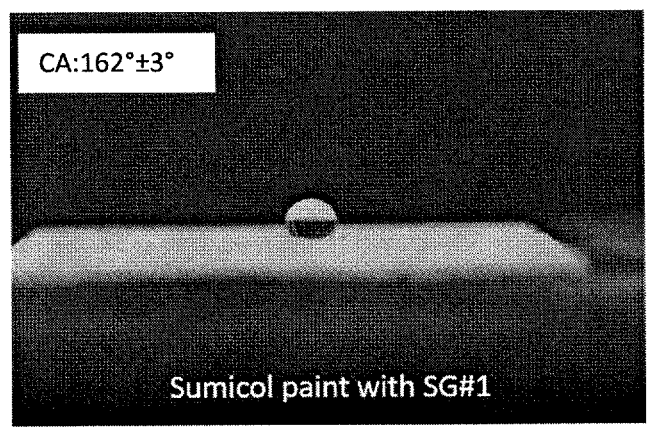
FIG. 1B a water drop on an equivalent painted surface after overcoating with formulation SG#1, according to an embodiment of the invention.
Figure 1C:
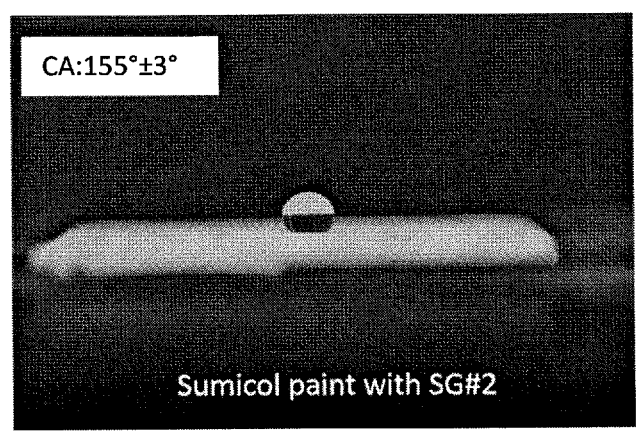
FIG. 1C a water drop on an equivalent painted surface after overcoating with formulation SG#2, according to an embodiment of the invention.

As can be seen in FIG. 1A, for the non-overcoated paint the water contact angle was 57±3°, which raised to 162±3° and 155±3° for overcoating with SG#1 and SG#2, respectively, as shown in FIGS. 1B and 1C, respectively.

Abrasion Test

Figure 2:
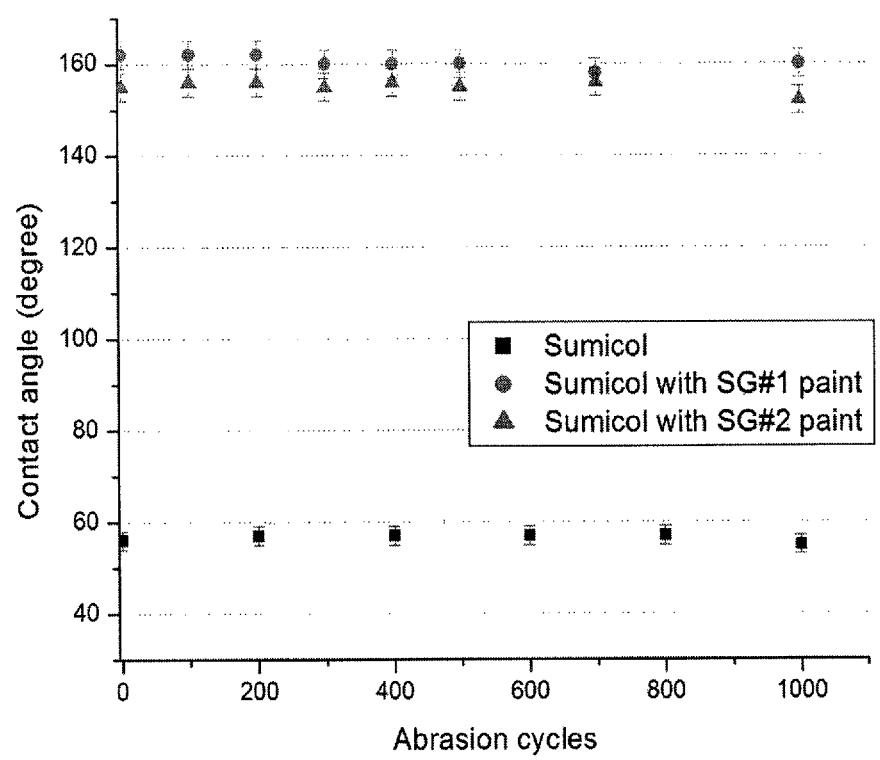
FIG. 2 shows a composite plot of contact angles over a series of various abrasion cycles for a painted surface and the paint overcoated with either SG#1 or SG#2.

Abrasion testing was carried out on the coated surfaces of FIGS. 1A, 1B, and 1C with a Taber 5700 Linear Abraser using a silicon carbide metallurgical paper 1200P for abrasion with a loaded weight of 0.98 N. Subsequently, measurements of the contact angle for 30 µL water drops at 20° C. were carried out. As illustrated in FIG. 2, the contact angles were retained to a large degree over 1000 abrasion cycles for both overcoats.

Figure 3:
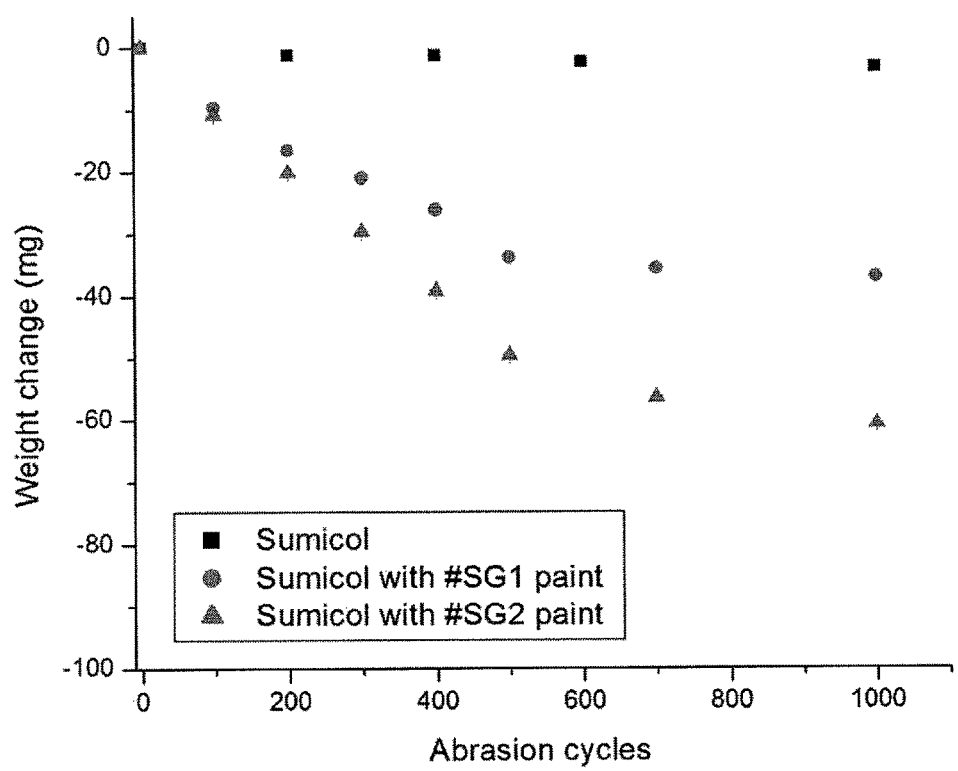
FIG. 3 shows a composite plot of weight loss over a series of various abrasion cycles for a painted surface and the paint overcoated with either SG#1 or SG#2.

From the date plotted in FIG. 3, wear indexes (WIs) were calculated. The WI for Sumicol paint is −3.4E-3 mg/cycle, −0.037 mg/cycle for Sumicol with SG#1, and −0.06 mg/cycle for Sumicol with SG#2. As can be seen in FIG. 3, at about 500 abrasion cycles a change in slope is observed for the overcoated samples where the wear dramatically drops to a level of about that of the paint, although, as indicated in FIG. 2, the overcoated surfaces remain superhydrophobic.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A superhydrophobic overcoat, comprising hydrophobic particles, a polymer binder, and at least one plasticizer that are suspended in a solvent, wherein the overcoat is dispersible on a substrate by spraying, rolling, brushing, or spin coating, and wherein the plasticizer is a mixture of triethyl phosphate and perfluoro(butyltetrahydrofuran).

2. The superhydrophobic overcoat according to claim 1, wherein the solvent is DMF (dimethylformamide), MEK (methyl ethyl ketone), or isophorone.

3. A superhydrophobic object, comprising a coating formed by deposition of the superhydrophobic overcoat according to claim 1.

4. The superhydrophobic overcoat according to claim 1, wherein the hydrophobic particles comprise metal oxide particles.

5. The superhydrophobic overcoat according to claim 4, wherein metal oxide particles comprise $SiO_2$, $TiO_2$, or $Al_2O_3$, and wherein the metal oxide particles are coated with a fluorinated alkyl silane or an alkyl silane.

6. The superhydrophobic overcoat according to claim 5, wherein the metal oxide particles are 40 nm to 100 µm in diameter.

7. The superhydrophobic overcoat according to claim 1, wherein the polymer binder is a mixture of PVDF and PMMA.

8. The superhydrophobic overcoat according to claim 7, wherein the PVDF and PMMA mixture is 3:1 to 10:1.

* * * * *